(12) United States Patent
Yoda et al.

(10) Patent No.: US 12,617,218 B2
(45) Date of Patent: May 5, 2026

(54) INK JET RECORDING APPARATUS

(71) Applicant: SEIKO EPSON CORPORATION, Tokyo (JP)

(72) Inventors: Toshiyuki Yoda, Matsumoto (JP); Kiyoshi Nakamura, Matsumoto (JP); Shohei Namikoshi, Shiojiri (JP); Takuya Ota, Shiojiri (JP); Keita Hanawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 240 days.

(21) Appl. No.: 18/193,676

(22) Filed: Mar. 31, 2023

(65) Prior Publication Data

US 2023/0311539 A1      Oct. 5, 2023

(30) Foreign Application Priority Data

Apr. 1, 2022    (JP) ................................. 2022-061686

(51) Int. Cl.
  B41J 11/00      (2006.01)
  B41M 7/00      (2006.01)
  C09D 11/101     (2014.01)

(52) U.S. Cl.
  CPC ...... B41J 11/00218 (2021.01); B41M 7/0081 (2013.01); C09D 11/101 (2013.01)

(58) Field of Classification Search
  None
  See application file for complete search history.

(56) References Cited

U.S. PATENT DOCUMENTS

| | | | |
|---|---|---|---|
| 6,550,905 B1 * | 4/2003 | Deckers .............. | C09D 11/101 |
| | | | 347/100 |
| 2009/0207224 A1 * | 8/2009 | Cofler ................. | B41J 13/0072 |
| | | | 347/102 |
| 2014/0055539 A1 | 2/2014 | Hayata | |
| 2024/0058784 A1 | 2/2024 | Murayama et al. | |

FOREIGN PATENT DOCUMENTS

| | | |
|---|---|---|
| JP | 2004-209706 A | 7/2004 |
| JP | 2014-043010 A | 3/2014 |
| JP | 2018-001067 A | 1/2018 |
| JP | 2022-101018 A | 7/2022 |

* cited by examiner

*Primary Examiner* — Alejandro Valencia
(74) *Attorney, Agent, or Firm* — Harness, Dickey & Pierce, P.L.C.

(57) ABSTRACT

An ink jet recording apparatus including an ink jet head for ejecting and attaching a radiation-curable ink jet composition to a recording medium and an irradiation unit for applying radiation to the recording medium to which the radiation-curable ink jet composition is attached under supply of an inert gas, wherein the irradiation unit has, successively in a transport direction of the recording medium, a nozzle face for ejecting the inert gas and an application face for applying radiation, and $h1 > h2$, where $h1$ is a distance from the recording medium to the nozzle face and $h2$ is a distance from the recording medium to the application face.

2 Claims, 1 Drawing Sheet

INK JET RECORDING APPARATUS

The present application is based on, and claims priority from JP Application Serial Number 2022-061686, filed Apr. 1, 2022, the disclosure of which is hereby incorporated by reference herein in its entirety.

BACKGROUND

1. Technical Field

The present disclosure relates to an ink jet recording apparatus.

2. Related Art

Ink jet recording methods have been rapidly developed in various fields since a high-definition image can be recorded by using a relatively simple apparatus. In this regard, various types of research have been performed on, for example, a method for curing a radiation-curable ink. For example, JP-A-2014-043010 discloses an ink jet recording method including a step of efficiently curing an ink jet ink by applying an active ray in a low-oxygen atmosphere.

JP-A-2014-043010 discloses an LED light source unit surrounded by an inert gas blanket 2 having an oxygen-poor atmosphere. However, when such a blanket is used to reduce hindrance to curing due to oxygen, a recording apparatus has to be increased in size.

SUMMARY

According to an aspect of the present disclosure, an ink jet recording apparatus includes an ink jet head for ejecting and attaching a radiation-curable ink jet composition to a recording medium and an irradiation unit for applying radiation to the recording medium to which the radiation-curable ink jet composition is attached under supply of an inert gas, wherein the irradiation unit has, successively in a transport direction of the recording medium, a nozzle face for ejecting the inert gas and an application face for applying radiation, and $h1>h2$, where $h1$ is a distance from the recording medium to the nozzle face and $h2$ is a distance from the recording medium to the application face.

DESCRIPTION OF EXEMPLARY EMBODIMENTS

Figure 1:
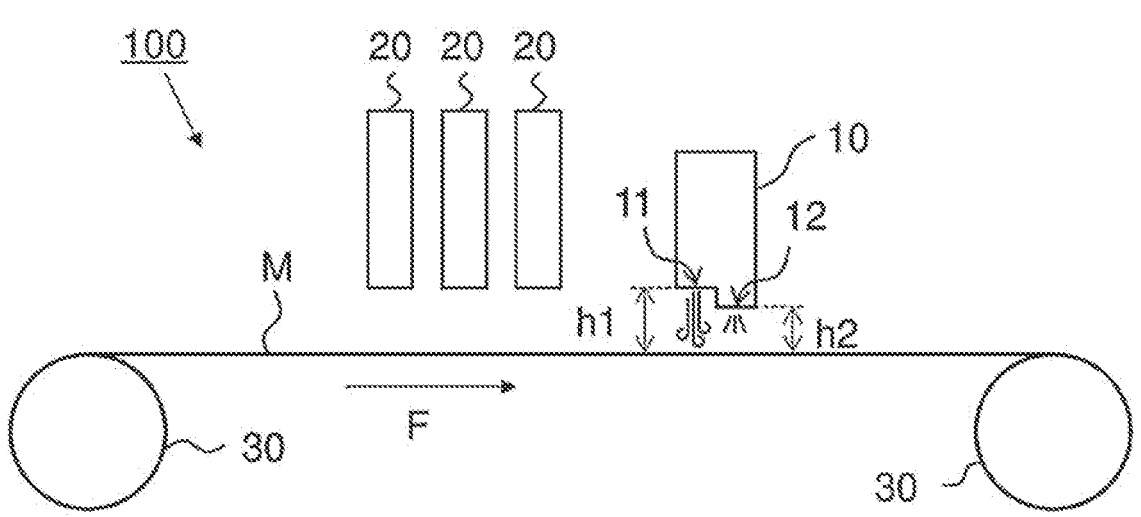
FIG. 1 is a schematic diagram illustrating an aspect of an ink jet recording apparatus according to the present embodiment.

The embodiment according to the present disclosure (hereafter referred to as "the present embodiment") will be described below in detail with reference to the drawings, as the situation demands. However, the present disclosure is not limited to this and can be variously modified within the bounds of not departing from the scope of the disclosure. In this regard, in the drawings, the same elements are indicated by the same references and duplicate explanations may be omitted. The positional relationship in the vertical direction, the horizontal direction, or the like is in accord with the positional relationship illustrated in the drawings, unless otherwise specified. Further, the actual dimensional ratios are not limited to the ratios illustrated in the drawings.

1. Ink Jet Recording Apparatus

An ink jet recording apparatus according to the present embodiment includes an ink jet head for ejecting and attaching a radiation-curable ink jet composition (hereafter also referred to as simply "ink composition") to a recording medium and an irradiation unit for applying radiation to the recording medium to which the radiation-curable ink jet composition is attached under supply of an inert gas, wherein the irradiation unit has, successively in a transport direction of the recording medium, a nozzle face for ejecting the inert gas and an application face for applying radiation, and $h1>h2$, where $h1$ is a distance from the recording medium to the nozzle face and $h2$ is a distance from the recording medium to the application face.

Regarding a recording apparatus in the related art, since there is a relatively large space between a recording medium and a UV irradiation portion, when an ink composition ejected onto the recording medium is cured, polymerization is susceptible to being hindered due to oxygen. From the viewpoint of suppressing polymerization from being hindered, it is considered that curing is to be performed under low-oxygen-concentration circumstances by performing UV irradiation in a portion surrounded by a blanket or the like. However, when surrounded by a blanket, apparatus size is unfavorably increased. On the other hand, when not providing a surrounding blanket, since the efficiency of oxygen concentration reduction by the inert gas is poor due to the large space of the UV irradiation portion, hindrance to polymerization is not readily suppressed from occurring. In particular, when printing speed is increased, a sufficient effect of suppressing hindrance due to oxygen is not obtained, and, in addition, a large gas generator is required due to an increase in the amount of the inert gas used.

On the other hand, in the present embodiment, an irradiation unit having a configuration in which a nozzle face for ejecting the inert gas and an application face for applying radiation satisfy a predetermined relationship is used. Consequently, the efficiency of oxygen concentration reduction by the inert gas can be improved without having to provide a surrounding blanket or the like.

FIG. 1 is a schematic diagram illustrating an ink jet recording apparatus according to the present embodiment. As illustrated in FIG. 1, the ink jet recording apparatus 100 includes an irradiation unit 10, ink jet heads 20, and transport portions 30. Configurations of these will be described below in detail.

1.1. Ink Jet Head

The ink jet head 20 is a device for ejecting and attaching an ink composition to a recording medium M. The ink jet head 20 has nozzles in a nozzle plate surface 21 opposite the recording medium M, and the ink composition is ejected from the nozzles. The nozzles may be arranged in a line.

The recording apparatus 100 according to the present embodiment may include the ink jet heads 20 independent of each other in accordance with a color such as cyan, magenta, yellow, black, or white. Alternatively, an ink jet head 20 may be configured to eject two or more colors of ink compositions.

Regarding the system for ejecting the ink composition from a nozzle, there is a method in which a pressure generation device is operated so as to eject the composition introduced into a pressure generation chamber of the ink jet head from the nozzle. Such an ejection method is also referred to as an ink jet method. There is no particular limitation regarding a method for pressurizing the ink composition in the nozzle, and examples include a piezoelectric method in which a liquid droplet of the ink composition is ejected by using a piezoelectric element and a thermal system in which a liquid droplet is ejected by heating.

Regarding the ink jet head 20 used in an ejection step, there are a line head for performing recording based on a line system and a serial head for performing recording based on a serial system. Of these, the line head is favorable. Consequently, printing speed can be improved.

In the line system including a line head, for example, an ink jet head having a width larger than or equal to a width of a recording medium is fixed to a recording apparatus. Subsequently, the recording medium is moved in a sub-scanning direction (longitudinal direction; transport direction of the recording medium) and an ink droplet is ejected from a nozzle of the ink jet head operatively associated with the movement so that an image is recorded on the recording medium.

In the serial system including a serial head, for example, an ink jet head is mounted on a carriage movable in a width direction of the recording medium. Subsequently, the carriage is moved in a main scanning direction (lateral direction; width direction of the recording medium) and an ink droplet is ejected from a nozzle opening of the ink jet head operatively associated with the movement so that an image can be recorded on the recording medium.

Of these, from the viewpoint of taking up the recording medium to which the ink is attached so that a large amount of printing can be performed at a high speed, the line system is favorably used. Regarding the line system, the recording medium is continuously sent in the sub-scanning direction, recording and application of radiation are successively performed by using a line head in a single pass, and the recording medium to which the ink is attached can be taken up downstream. In this regard, the form of the recording apparatus illustrated in FIG. 1 is an example of the line system.

1.2. Irradiation Unit

The irradiation unit 10 is a device for applying radiation to the recording medium to which the ink composition is attached under supply of an inert gas. The irradiation unit 10 has, successively in a transport direction F of the recording medium, a nozzle face 11 for ejecting the inert gas and an application face 12 for applying radiation. In this regard, "unit" denotes that the nozzle face 11 for ejecting the inert gas and the application face 12 for applying radiation are integrally formed.

Consequently, first, an image is formed by the recording medium transported in the transport direction F and passing under the nozzle face of the ink jet head 20. Subsequently, a space in which the oxygen concentration is low is created in the vicinity of the surface to which the ink composition is attached by the recording medium being passed under the nozzle face 11 of the inert gas of the irradiation unit 10. Finally, the ink composition attached to the recording medium is cured with radiation by the recording medium being passed under the application face 12 of the radiation of the irradiation unit 10.

In particular, regarding the irradiation unit 10 used in the present embodiment, a distance h1 from the recording medium to the nozzle face 11 and a distance h2 from the recording medium to the application face 12 satisfy a relationship h1>h2. Since the distance h2 from the downstream recording medium M to the application face 12 is set to be smaller than the distance h1 from the upstream recording medium M to the nozzle face 11 of the inert gas, as described above, the inert gas which is supplied from the nozzle face 11 so as to fill a space just under the nozzle face 11 readily flows to a space just under the application face 12 in accordance with a flow in the transport direction F. Consequently, a space in which the oxygen concentration is low is created in the vicinity of the surface to which the ink composition is attached, and the efficiency of oxygen concentration reduction by the inert gas can be thereby improved without a surrounding blanket or the like being provided.

In other words, in satisfying the relationship h1>h2, the volume of the space between the application face 12 and the surface of the recording medium M is smaller than the volume of the space between the nozzle face 11 and the surface of the recording medium M. Therefore, a space in which the oxygen concentration is low can be created in the vicinity of the surface to which the ink composition is attached due to part of the inert gas which is supplied from the nozzle face 11 flowing to the space just under the application face 12 in accordance with the flow in the transport direction F. Consequently, the efficiency of oxygen concentration reduction by the inert gas can be thereby improved so that the curing efficiency due to application of radiation can be improved without providing a surrounding blanket or the like in the space between the application face 12 and the surface of the recording medium M. As a result, an ink jet recording apparatus having an excellent curing efficiency due to an inert gas can be provided, while the apparatus is reduced in size on the whole.

On the other hand, when the volume of the space between the nozzle face 11 and the surface of the recording medium M is substantially equal to the volume of the space between the application face 12 and the surface of the recording medium M or when the volume of the space between the application face 12 and the surface of the recording medium M is configured to be larger, reduction in the oxygen concentration just under the application face 12 is insufficient even when part of the inert gas which is supplied from the nozzle face 11 flows to the space just under the application face 12 in accordance with the flow in the transport direction F.

There is no particular limitation regarding a height ratio of the value of h2 to the value of h1 provided that the relationship h1>h2 is satisfied. For example, the height ratio of the value of h2 to the value of h1 is preferably 0.10 to 0.95 times, more preferably 0.20 to 0.85 times, and further preferably 0.30 to 0.75 times.

Figure 2:
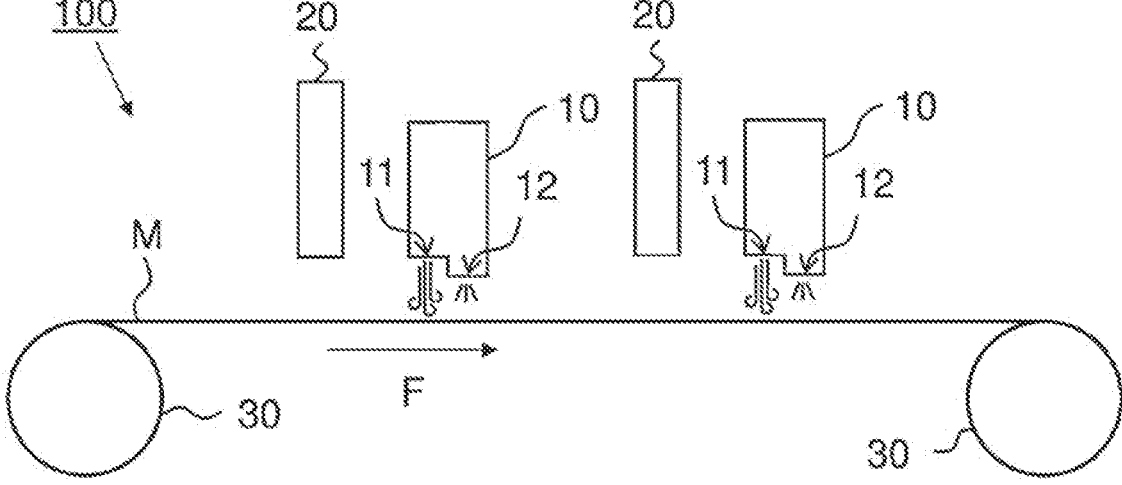
FIG. 2 is a schematic diagram illustrating another aspect of the ink jet recording apparatus according to the present embodiment.

FIG. 2 is a schematic diagram illustrating another aspect of the ink jet recording apparatus 100 according to the present embodiment. As illustrated in FIG. 2, the recording apparatus 100 according to the present embodiment may include a plurality of ink jet heads 20, and the irradiation units 10 may be included in one-to-one correspondence with the ink jet heads 20.

More specifically, the recording apparatus 100 according to the present embodiment may include the ink jet heads 20 independent of each other in accordance with a color such as cyan, magenta, yellow, black, or white and may include the irradiation units 10 in one-to-one correspondence with the ink jet heads 20. Consequently, the image quality of the recorded material tends to be further improved.

In particular, the irradiation unit 10 according to the present embodiment can improve the efficiency of oxygen concentration reduction by the inert gas and can improve the efficiency of curing by the radiation in the space between the application face 12 and the surface of the recording medium M without including the blanket or the like. Consequently, since the irradiation unit 10 can be reduced in size, the irradiation unit 10 can be disposed in one-to-one correspondence with the ink jet head 20.

On the other hand, regarding a recording apparatus including a blanket or the like in the related art, in consideration of practical limitation of the apparatus size, it is appropriate to dispose an irradiation unit 10 for a plurality of ink jet heads 20, and it is substantially difficult to dispose an irradiation unit 10 in one-to-one correspondence with an ink jet head 20.

1.3. Transport Portion

The recording apparatus 100 according to the present embodiment may include a transport portion 30 for transporting the recording medium M. There is no particular limitation regarding the transport portion 30, provided that the transport portion 30 is configured to transport the recording medium M in the transport direction F. For example, in FIG. 1, the transport portion 30 which sends out the roll-like recording medium M and the transport portion 30 which takes up the roll-like recording medium M are illustrated.

1.4. Recording Medium

There is no particular limitation regarding the recording medium used in the recording apparatus 100 according to the present embodiment, and, for example, a nonabsorbent recording medium is favorable. In particular, regarding the recording medium used in the present embodiment, it is preferable that both the recording surface and the non-recording surface be nonabsorbent. Using such a recording medium enables a recorded material suitable for a label use and the like to be obtained. In addition, since cured coating film of the ink readily comes into close contact with the non-recording surface due to nonabsorbency, unevenness formed by a second ink more effectively functions so that the releasability of the recorded material tends to be further improved.

There is no particular limitation regarding the nonabsorbent recording medium, and examples include plastic films and plates formed of polyvinylchlorides, polyethylenes, polypropylenes, polyethylene terephthalates (PETs), polycarbonates, polystyrenes, polyurethanes, and the like; metal plates formed of iron, silver, copper, aluminum, and the like; metal plates or plastic films and alloy plates such as stainless steel and brass, produced by vapor-depositing these metals; and recording media in which a plastic film of a polyvinylchloride, a polyethylene, a polypropylene, a polyethylene terephthalate (PET), a polycarbonate, a polystyrene, a polyurethane, or the like is bonded (coating) to paper base materials.

In this regard, in the present embodiment, nonabsorbency refers to an amount of water absorbed in 30 msec from the start of contact being 10 mL/m$^2$ or less in accordance with the Bristow method. The nonabsorbent recording medium is a recording medium having such nonabsorbency. The Bristow method is the most widely used method for measuring an amount of a liquid absorbed in a short time and is also adopted by the Japan Technical Association of the Pulp and Paper Industry (JAPAN TAPPI). The test method is described in detail in Standard No. 51 "Paper and Paperboard-Liquid Absorbency Test Method-Bristow Method" of "JAPAN TAPPI Paper and Pulp Test Methods 2000 edition".

2. Recording Method

The recording method according to the present embodiment is a recording method of the above-described ink jet recording apparatus and includes an ejection step of ejecting and attaching the ink composition to the recording medium and an irradiation step of applying radiation to the ink composition attached to the recording medium so as to obtain a cured coating film of the ink composition. In the irradiation step, radiation is applied to the recording medium to which the ink composition is attached under supply of an inert gas.

2.1. Ejection Step

The ejection step is a step of ejecting the ink composition from the ink jet head 20 and attaching the ink composition to the recording medium M. More specifically, a pressure generation device is operated so as to eject the composition introduced into a pressure generation chamber of the ink jet head from the nozzle.

From the viewpoint of taking up the recording medium to which the ink is attached, it is preferable that the line system be used in the ejection step. Regarding the line system, the recording medium is continuously sent in the sub-scanning direction, recording and application of radiation are successively performed by using a line head, and the recording medium to which the ink is attached is taken up downstream. In this regard, the form of the recording apparatus illustrated in FIG. 1 is the line system.

There is no particular limitation regarding the mode of attachment such as ink duty in the ejection step, and the mode can be appropriately adjusted in accordance with an objective image.

2.2. Irradiation Step

The irradiation step is a step of applying radiation from the application face 12 of the irradiation unit 10 to the ink attached to the recording medium M, while the inert gas is sent from the nozzle face 11 so as to obtain a cured coating film of the ink while polymerization is suppressed from being hindered due to oxygen.

In the irradiation step, radiation is applied to the ink composition attached to the recording medium. When the radiation is applied, a polymerization reaction of a monomer is initiated, and the ink composition is cured so as to form a coating film. In such an instance, a polymerization initiator that is present generates an active species (initiation species) such as a radical, an acid, or a base, and the polymerization reaction of the monomer is facilitated due to the function of the initiation species.

The irradiation step is a step of applying radiation to a radiation-curable ink jet composition attached to the recording medium so as to obtain a cured coating film of the radiation-curable ink jet composition. In particular, in the irradiation step of the present embodiment, radiation is applied under supply of the inert gas to the recording medium to which the radiation-curable ink jet composition is attached.

Herein, examples of the radiation include ultraviolet rays, infrared rays, visible rays, and X-rays. The radiation from a radiation source disposed downstream of the ink jet head is applied to the composition. There is no particular limitation regarding the radiation source, and the radiation source is, for example, a UV-LED. Using such a radiation source enables a size reduction of the apparatus and a cost reduction to be realized. The UV-LED serving as an ultraviolet source is small and can therefore be incorporated in an ink jet recording apparatus.

In particular, the irradiation unit has, successively in the transport direction of the recording medium, the nozzle face for ejecting the inert gas and the application face for applying radiation, and h1>h2, where h1 is a distance from the recording medium to the nozzle face and h2 is a distance from the recording medium to the application face. The above-described irradiation step being performed by using such an irradiation unit tends to further suppress hindrance due to oxygen from occurring.

2.3. Stacking Step

The recording method according to the present embodiment may include a stacking step of stacking the recorded material so that the recording surface to which the ink composition is attached and the non-recording surface to which the ink composition is not attached are opposite each other.

There is no particular limitation regarding the stacking method in the stacking step. For example, cut-sheet-like recorded materials are stacked one on top of another so that the recording surface and the non-recording surface are opposite each other or a recorded material in which recording is continuously performed on a long recording medium is taken up into a roll-like shape downstream of the recording apparatus so that the recording surface and the non-recording surface are opposite each other. More specifically, the recorded material can be made into a rolled body by being taken up using a take-up roller. In the resulting rolled body, the recorded material is rolled while being stacked so that the recording surface and the non-recording surface are opposite each other.

3. Ink Composition

In the present embodiment, the radiation-curable ink jet composition is an ink jet composition that is cured by being irradiated with radiation. Examples of the radiation include ultraviolet rays, electron beams, infrared rays, visible rays, and X-rays. Of these, ultraviolet rays are favorable as the radiation from the viewpoint of the radiation source being readily available and in widespread use and also from the viewpoint of the material suitable for curing by application of ultraviolet rays being readily available and in widespread use.

There is no particular limitation regarding the radiation-curable ink jet composition according to the present embodiment, and, for example, a polymerizable compound, a photopolymerization initiator, a polymerization inhibitor, a slip agent, a coloring material, a dispersing agent, and the like may be contained. In this regard, the ink composition may be an ink composition for an undercoat used as a base or the like, an ink composition for forming an image, such as a color ink, or an ink composition for an overcoat.

3.1. Polymerizable Compound

The polymerizable compound contains a monofunctional monomer and, as the situation demands, may contain a polyfunctional monomer.

There is no particular limitation regarding the monofunctional monomer, and examples include monofunctional monomers having an alicyclic group, monofunctional monomers having an aromatic group, and monofunctional monomers having a nitrogen-containing heterocyclic group. In this regard, monomers other than these may be used as the monofunctional monomer.

There is no particular limitation regarding the polyfunctional monomer, and examples include vinyl-containing (meth)acrylates and polyfunctional (meth)acrylates.

3.2. Photopolymerization Initiator

There is no particular limitation regarding the photopolymerization initiator provided that an active species is generated by application of radiation, and examples include known photopolymerization initiators, such as acylphosphine-oxide-based photopolymerization initiators, alkylphenone-based polymerization initiators, titanocene-based polymerization initiators, and thioxanthone-based photopolymerization initiators. Of these, acylphosphine-oxide-based photopolymerization initiators are favorable. Using such a photopolymerization initiator further improves the curability of the ink. In particular, the curability through a curing process due to the light from the UV-LED tends to be further improved. The photopolymerization initiators may be used alone, or at least two types may be used in combination.

3.3. Polymerization Inhibitor

There is no particular limitation regarding the polymerization inhibitor, and examples include p-methoxyphenol, hydroquinone monomethyl ether (MEHQ), 4-hydroxy-2,2, 6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds. The polymerization inhibitors may be used alone, or at least two types may be used in combination.

3.4. Slip Agent

Regarding the slip agent, silicone-based surfactants are favorable, and polyester-modified silicones or polyether-modified silicones are more favorable. Examples of the polyester-modified silicone include BYK-347, 348, BYK-UV3500, 3510, and 3530 (all produced by BYK Additives & Instruments), and examples of the polyether-modified silicone include BYK-3570 (produced by BYK Additives & Instruments). The slip agents may be used alone, or at least two types may be used in combination.

3.5. Coloring Material

Regarding the coloring material, at least one of a pigment and a dye can be used. In this regard, a dispersing agent may be used in accordance with the type of the coloring material. There is no particular limitation regarding the dispersing agent, and examples include dispersing agents such as polymer dispersing agents commonly used for preparing pigment dispersion liquids. Specific examples include dispersing agents containing at least one of polyoxyalkylenes, polyalkylenes, polyamines, vinyl-based polymers or copolymers, acrylic polymers or copolymers, polyesters, polyamides, polyimides, polyurethanes, amino-based polymers, silicon-containing polymers, sulfur-containing polymers, fluorine-containing polymers, and epoxy resins. The dispersing agents may be used alone, or at least two types may be used in combination.

What is claimed is:

1. An ink jet recording apparatus comprising:
a plurality of ink jet heads for ejecting and attaching a radiation-curable ink jet composition to a recording medium; and
a plurality of irradiation units for applying radiation to the recording medium to which the radiation-curable ink jet composition is attached under supply of an inert gas,
wherein the irradiation units are provided in one-to-one correspondence with the ink jet heads, and each irradiation unit is located immediately downstream from a respective ink jet head,
each of the irradiation units has a body that includes a recording-medium facing surface that defines a nozzle face and an application face such that the nozzle face and the application face are integral with the body, the nozzle face and the application face are arranged successively in a transport direction of the recording medium, and the nozzle face is configured for ejecting the inert gas and the application face is configured for applying radiation, the nozzle face is a first planar surface of the recording-medium facing surface, the application face is a second planar surface of the recording-medium facing surface, and the first and second planar surfaces are separated from each other by a third planar surface that extends orthogonally relative to each of the first and second planar surfaces such that h1>h2, where h1 is a distance from the recording medium to the nozzle face and h2 is a distance from the recording medium to the application face.

2. The ink jet recording apparatus according to claim 1, wherein the ink jet head and the irradiation unit each have a respective width larger than or equal to a width of the recording medium.

\* \* \* \* \*